US008631095B2

(12) United States Patent
Hartman

(10) Patent No.: US 8,631,095 B2
(45) Date of Patent: Jan. 14, 2014

(54) COORDINATING MULTIPLE ASYNCHRONOUS POSTBACKS

(75) Inventor: Brian J. Hartman, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 714 days.

(21) Appl. No.: 12/649,314

(22) Filed: Dec. 29, 2009

(65) Prior Publication Data

US 2011/0161464 A1 Jun. 30, 2011

(51) Int. Cl.
G06F 15/16 (2006.01)

(52) U.S. Cl.
USPC .......................................................... 709/219

(58) Field of Classification Search
USPC .......................................................... 709/219
See application file for complete search history.

(56) References Cited

U.S. PATENT DOCUMENTS

| 6,401,099 | B1 | 6/2002 | Koppolu et al. | |
|---|---|---|---|---|
| 7,013,340 | B1 | 3/2006 | Burd et al. | |
| 7,051,084 | B1* | 5/2006 | Hayton et al. | 709/219 |
| 7,076,786 | B2 | 7/2006 | Burd et al. | |
| 7,280,558 | B1 | 10/2007 | Grunkemeyer et al. | |
| 7,716,281 | B2* | 5/2010 | Lin et al. | 709/203 |
| 7,805,670 | B2* | 9/2010 | Lipton et al. | 715/234 |
| 2005/0256933 | A1* | 11/2005 | Millington et al. | 709/207 |
| 2006/0095576 | A1 | 5/2006 | Perry et al. | |
| 2007/0162539 | A1 | 7/2007 | Jin et al. | |
| 2007/0214239 | A1* | 9/2007 | Mechkov et al. | 709/219 |
| 2008/0126138 | A1* | 5/2008 | Cherney et al. | 705/4 |
| 2008/0235708 | A1* | 9/2008 | Lopez | 719/311 |
| 2009/0083646 | A1* | 3/2009 | Lin et al. | 715/769 |

OTHER PUBLICATIONS

"Handling Multiple Asynchronous Postbacks", retrieved at <<http://weblogs.asp.net/andrewfrederick/archive/2008/03/27/handling-multiple-asynchronous-postbacks.aspx>>, Mar. 27, 2008. pp. 4.
Houle, Paul, "Keeping Track of State in Asynchronous Callbacks", retrieved at << http://gen5.info/q/2008/06/02/keeping-track-of-state-in-asynchronous-callbacks/>>, Jun. 2, 2008. pp. 8.
Stefan, "Load and Display Page Contents Asynchronously with Full Postback Support", retrieved at <<http://www.codeproject.com/KB/ajax/PartialUpdatePanel.aspx>>, Feb. 20, 2008. pp. 13.
"Ajax and the ASP.NET 2.0 Callback Framework", retrieved at<<http://resources.esri.com/help/9.3/ArcGISServer/adf/dotnet/developer/ADF/ajax__aspnet.htm>>, 2009. pp. 6.
Gallo, et al., "Exploring the Ajax server Extensions", retrieved at <<http://citeseerx.ist.psu.edu/viewdoc/download?doi=10.1.1.110.9219&rep=rep1&type=pdf>>, 2008. pp. 31.
Gallo et al, "ASP.NET Ajax in Action", Publisher: Manning Publications Co., Chapter 6, 2008, 37 pages.
Gallo et al, "ASP.NET Ajax in Action", Publisher: Manning Publications Co., Chapter 7, 2008, 20 pages.

* cited by examiner

Primary Examiner — Imad Hussain

(57) ABSTRACT

Techniques are described herein for coordinating multiple asynchronous postbacks. Each postback specifies a requestor that initiates the postback. A requestor is a request to update a corresponding region of a Web page. Each time a server receives a postback from a client, the server provides a response to the client that includes an update regarding a region of the Web page that corresponds to a requestor that initiates the postback. The response further includes a requestor for each region of the Web page that is to be updated once the response is processed by the client. Upon receipt of each response from the server, the client provides a postback to the server. The client and server may continue to communicate in this manner until all regions of the Web page that are to be updated have been updated.

20 Claims, 6 Drawing Sheets

COORDINATING MULTIPLE ASYNCHRONOUS POSTBACKS

BACKGROUND

Users often use clients, such as Web browsers, to access Web pages that are stored on servers. When a user clicks on a link to a Web page, for example, the user's client may send a hypertext transfer protocol (HTTP) request to a server on which the Web page is stored. Upon receiving the HTTP request, the server provides the Web page to the client. The Web page may include a variety of components, such as charts, tables, etc. The server may analyze data for generating the various components before the components can be provided to the client. Accordingly, a delay may occur between a time at which the client sends the HTTP request to the server and a time at which the various components are ready to be provided to the client.

In accordance with one conventional technique for providing a Web page to a client, a server does not provide any information regarding the Web page to the client until all components of the Web page are ready to be provided. In accordance with this technique, after the server determines that all of the components are ready, the server provides all of the components to the client at once. Accordingly, a user of the client is not informed of the server's status with respect to provision of the Web page until the Web page eventually is provided to the client, which may negatively affect the user's satisfaction regarding the user's Web experience.

In accordance with another conventional technique for providing a Web page to a client, a server initially provides an indicator to the client that specifies that the Web page will be provided when all of the components of the Web page are ready to be provided. In accordance with this technique, a user of the client is informed of the server's status, which may improve the user's satisfaction regarding the user's Web experience. For instance, a framework of the Web page may be provided to the client along with the indicator to indicate that progress is being made with respect to provision of the Web page.

However, conventional techniques for providing a Web page to a client, including those techniques mentioned above, may result in substantial delays before any of the components of the Web page are provided to the client.

SUMMARY

Various approaches are described herein for, among other things, coordinating multiple asynchronous postbacks. Each asynchronous postback specifies a requestor that initiates the asynchronous postback. A requestor is a request to update a corresponding region of a Web page. For example, a client may provide an asynchronous postback that specifies a requestor to a server, so that the server will provide a region of a Web page that corresponds to the requestor to the client.

An example method is described in which requestors that correspond to respective regions of a Web page are rendered to a client. Each requestor includes a request that the client select the respective region for updating. A postback is received from the client. The postback specifies a requestor that initiates the postback. A response is provided to the client in response to receiving the postback. The response includes an update regarding a region of the Web page that corresponds to the requestor that initiates the postback. The response further includes a requestor for each region in a subset of the regions of the Web page that is to be updated with respect to the client once the response is processed by the client.

It is possible that some regions of the Web page are to be updated even if those regions have been provided to the client. For instance, a region of the Web page that has already been provided may be updated if updating another region causes a change with respect to the region that has already been provided. Moreover, updating a region can render a postback regarding another region unnecessary. For instance, the client may be capable of extracting information from an update regarding a first region in order to update a second region, thereby eliminating the need for the client to provide a postback regarding the second region.

Another example method is described in which requestors that correspond to respective regions of a Web page are received from a server. Each requestor includes a request that the respective region be selected for updating. A postback is provided to the server in response to receiving the requestors. The postback specifies a requestor that initiates the postback. A response is received from the server in response to providing the postback. The response includes an update regarding a region of the Web page that corresponds to the requestor that initiates the postback. The response further includes a requestor for each region in a subset of the regions of the Web page that is to be updated with respect to the client once the response is processed by the client.

An example system is described that includes a content module, an object module, and a response module. The content module is configured to render requestors that correspond to respective regions of a Web page to a client. Each requestor includes a request that the client select the respective region for updating. The content module is further configured to interpret a postback from the client. The postback specifies a requestor that initiates the postback. The response module is configured to provide the response to the client in response to the postback. The response includes an update regarding a region of the Web page that corresponds to the requestor that initiates the postback. The response further includes a requestor for each region in the subset.

Another example system is described that includes requestor receipt module, a postback module, and a response receipt module. The requestor receipt module is configured to interpret requestors that correspond to respective regions of a Web page. Each requestor includes a request that the respective region be selected for updating. The postback module is configured to provide a postback to the server in response to receipt of the requestors. The postback specifies a requestor that initiates the postback. The response receipt module is configured to interpret a response to the postback. The response includes an update regarding a region of the Web page that corresponds to the requestor that initiates the postback. The response further includes a requestor for each region in a subset of the regions of the Web page that is to be updated with respect to the client once the response is processed by the client.

An example computer program product is described that includes a computer-readable medium having computer program logic recorded thereon for coordinating multiple asynchronous postbacks. The computer program product includes first, second, and third program logic modules. The first program logic module is for enabling the processor-based system to render requestors that correspond to respective regions of a Web page to a client. Each requestor includes a request that the client select the respective region for updating. The second program logic module is for enabling the processor-based system to interpret a postback from the client. The postback specifies a requestor that initiates the postback. The third program logic module is for enabling the processor-based system to provide a response to the client in response to the postback. The response includes an update regarding a region of the Web page that corresponds to the requestor that initiates the postback. The response further includes a requestor for each region in a subset of the regions of the Web page that is to be updated with respect to the client once the response is processed by the client.

Another example computer program product is described that includes a computer-readable medium having computer program logic recorded thereon for coordinating multiple asynchronous postbacks. The computer program product includes first, second, and third program logic modules. The first program logic module is for enabling the processor-based system to interpret requestors that correspond to respective regions of a Web page. Each requestor includes a request that the respective region be selected for updating. The second program logic module is for enabling the processor-based system to provide a postback to the server in response to receipt of the requestors. The postback specifies a requestor that initiates the postback. The third program logic module is for enabling the processor-based system to interpret a response to the postback that includes an update regarding a region that corresponds to the requestor that initiates the postback and that further includes a requestor for each region in a subset of the regions of the Web page that is to be updated with respect to the client once the response is processed by the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
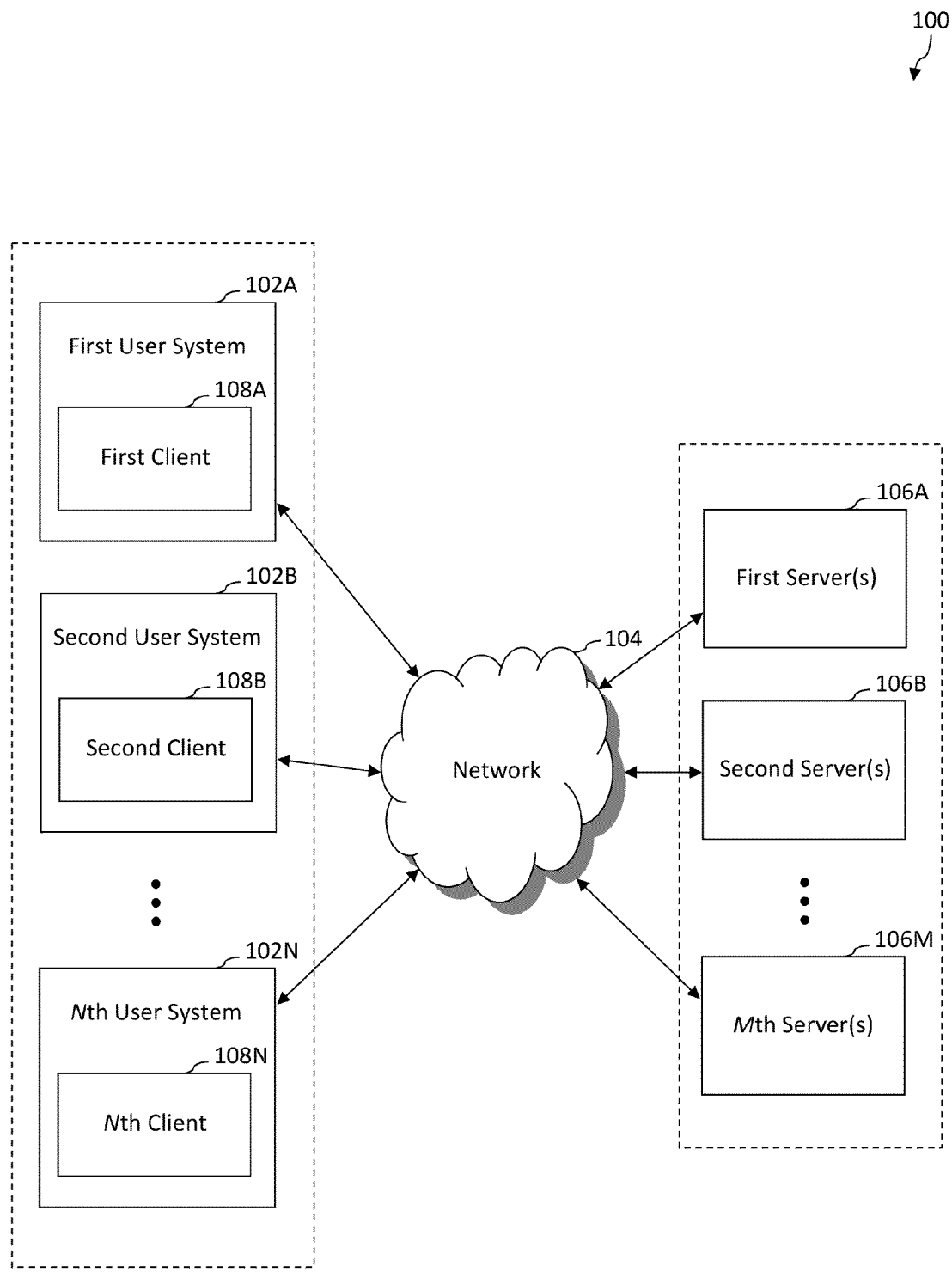
FIG. 1 is a block diagram of an example computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

Some exemplary embodiments are described herein in the context of the World Wide Web (WWW). It will be recognized by persons skilled in the relevant art(s) that the exemplary embodiments are not limited to such context. Rather, the exemplary embodiments are applicable to any suitable context, which may or may not include the WWW.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments for Coordinating Multiple Asynchronous Postbacks

Example embodiments described herein are capable of coordinating multiple asynchronous postbacks. Asynchronous postbacks remove the need for an entire Web page to be refreshed as the result of a postback. Instead, only those regions of the Web page that have changed are updated. As a result, users do not see the entire Web page reload with every postback, which makes user interaction with the Web page more seamless. Each asynchronous postback specifies a requestor that initiates the asynchronous postback. A requestor is a request to update a corresponding region of a Web page. For example, a client may provide an asynchronous postback that specifies a requestor to a server, so that the server will provide a region of a Web page that corresponds to the requestor to the client.

When a client provides an initial request for a Web page to a server, the initial request is referred to as a "GET" request. If the server does not provide all requested regions of the Web page to the client in its response to the get request, the client may provide additional requests, which are referred to as "POST" requests (a.k.a. postbacks), to the server until no regions of the Web page are to be updated (e.g., until all regions of the Web page are received by the client).

It is possible that some regions of the Web page are to be updated even if those regions have been received by the client. For instance, a region of the Web page that has already been received may be updated if updating another region causes a change with respect to the region that has already been received. Moreover, updating a region can render a postback regarding another region unnecessary. For instance, the client may be capable of extracting information from an update regarding a first region in order to update a second region, thereby eliminating the need for the client to provide a postback regarding the second region.

In accordance with example embodiments, each postback specifies a requestor that initiates the postback. A requestor is a request to update a corresponding region of a Web page. Each time a server receives a postback from a client, the server provides a response to the client that includes an update regarding a region of the Web page that corresponds to a requestor that initiates the postback. The response further includes a requestor for each region of the Web page that is to be updated once the response is processed by the client. Upon receipt of each response from the server, the client provides a postback to the server. The client and the server may continue to communicate in the manner described above until all regions of the Web page that are to be updated have been updated.

Techniques described herein for coordinating multiple asynchronous postbacks have a variety of benefits as compared to conventional techniques for providing a Web page to a client. For example, the techniques described herein may be capable of using postbacks to change the remaining updates that are to be requested by the client without the need for a complex management system on the client. For instance, provision of a Web page to a client may be easier and/or more reliable to manage using server code than using script (e.g., JavaScript®) on the client. Accordingly, systems that implement the techniques described herein may be easier to maintain and/or more robust.

The techniques described herein may not require more coordination on the server than conventional techniques. For example, a single self-contained object for each region of a Web page may keep track of whether an update for the respective region is needed. The normal workflow of an ASP.NET postback, for example, is capable of setting an object that corresponds to a region of the Web page if that region is to be updated. Accordingly, it is not necessary for server code to be used to maintain a list of regions of the Web page that need to be updated and to invalidate entries in the list based on user code executing on the server. The techniques described herein may be performed using any suitable Web application framework (e.g., an ASP.NET Web application framework) in accordance with a hypertext transfer protocol (HTTP), though the scope of the example embodiments is not limited in this respect.

Some example embodiments update each region of a Web page separately, so that there is no need to wait for long-running operations that are associated with the respective regions of the Web page to complete before information is provided to a client. For instance, a server may provide the information to the client as soon as the information becomes available.

FIG. 1 is a block diagram of an example computer system 100 in accordance with an embodiment. Generally speaking, computer system 100 operates to provide Web pages to users of computer system 100 when the users initiate requests for those Web pages. In accordance with example embodiments, computer system 100 is capable of coordinating asynchronous postbacks for providing regions of the Web pages to the users as those regions become available. Further detail regarding techniques for coordinating asynchronous postbacks is provided in the following discussion.

As shown in FIG. 1, computer system 100 includes a plurality of user systems 102A-102N, a network 104, and a plurality of servers 106A-106M. Communication among user systems 102A-102N and servers 106A-106M is carried out over network 104 using well-known network communication protocols. Network 104 may be a wide-area network (e.g., the Internet), a local area network (LAN), another type of network, or a combination thereof.

User systems 102A-102N are processing systems that are capable of communicating with servers 106A-106M. An example of a processing system is a system that includes at least one processor that is capable of manipulating data in accordance with a set of instructions. For instance, a processing system may be a computer, a personal digital assistant, etc.

User systems 102A-102N include respective clients 108A-108N. Clients 108A-108N are configured to provide requests to servers 106A-106M for requesting information that is stored on (or otherwise accessible via) servers 106A-106M. For example, clients 108A-108N are capable of accessing Web sites hosted by servers 106A-106M, so that clients 108A-108N may access information that is available via the Web sites. Such information may include documents (e.g., Web pages, images, video files, etc.), output of executables, or any other suitable type of information. The Web pages may be provided as hypertext markup language (HTML) documents and objects (e.g., files) that are linked therein, for example.

In accordance with example embodiments, one or more of clients 108A-108N are capable of interpreting requestors that are received from a server (e.g., any of servers 106A-106M) in response to the client requesting a Web page from the server. Each requestor includes a request that a respective region of the Web page be selected for updating. The client provides an asynchronous postback to the server that specifies which one of the requestors initiated the postback. The client may thereafter ignore the requestors that did not initiate the asynchronous postback, thought the scope of the example embodiments is not limited in this respect.

Upon providing the asynchronous postback, the client receives an update regarding a region of the Web page that corresponds to the requestor that initiated the postback. A requestor that initiates a postback is referred to herein as an "initiating requestor". If any regions of the Web page are to be updated after the region of the Web page that corresponds to the requestor that initiated the postback (i.e., the initiating requestor) is updated, the client also receives requestors that pertain to those regions from the server. The client may continue to communicate with the server in the manner described above until all regions of the Web page that are to be updated have been updated.

It will be recognized that any one or more user systems 102A-102N may communicate with any one or more servers 106A-106M. User systems 102A-102N may include any client-enabled system or device, including but not limited to a desktop computer, a laptop computer, a personal digital assistant, a cellular telephone, or the like.

Servers 106A-106M are processing systems that are capable of communicating with user systems 102A-102N. Servers 106A-106M are configured to provide information to users in response to receiving requests from the users. For example, servers 106A-106M are capable of hosting respective Web sites, so that the Web sites are accessible to users of computer system 100.

In accordance with example embodiments, when a client (e.g., any of clients 108A-108N) requests a Web page from a server (e.g., any of servers 106A-106M), the server may initially provide a framework of the Web page to the client. In addition or alternatively, the server may initially provide a notification to the client if not all regions of the Web page are available. For instance, the notification may include wait indicator(s) that correspond to the regions of the Web page that are not yet available. The server is capable of rendering requestors to the client regarding regions of the Web page that are to be updated. Each requestor includes a request that the client select the respective region for updating. For example, the regions of the Web page that are to be updated may include regions that have thus far been unavailable, regions that are changed based on other region(s) being updated, etc.

Figure 2:
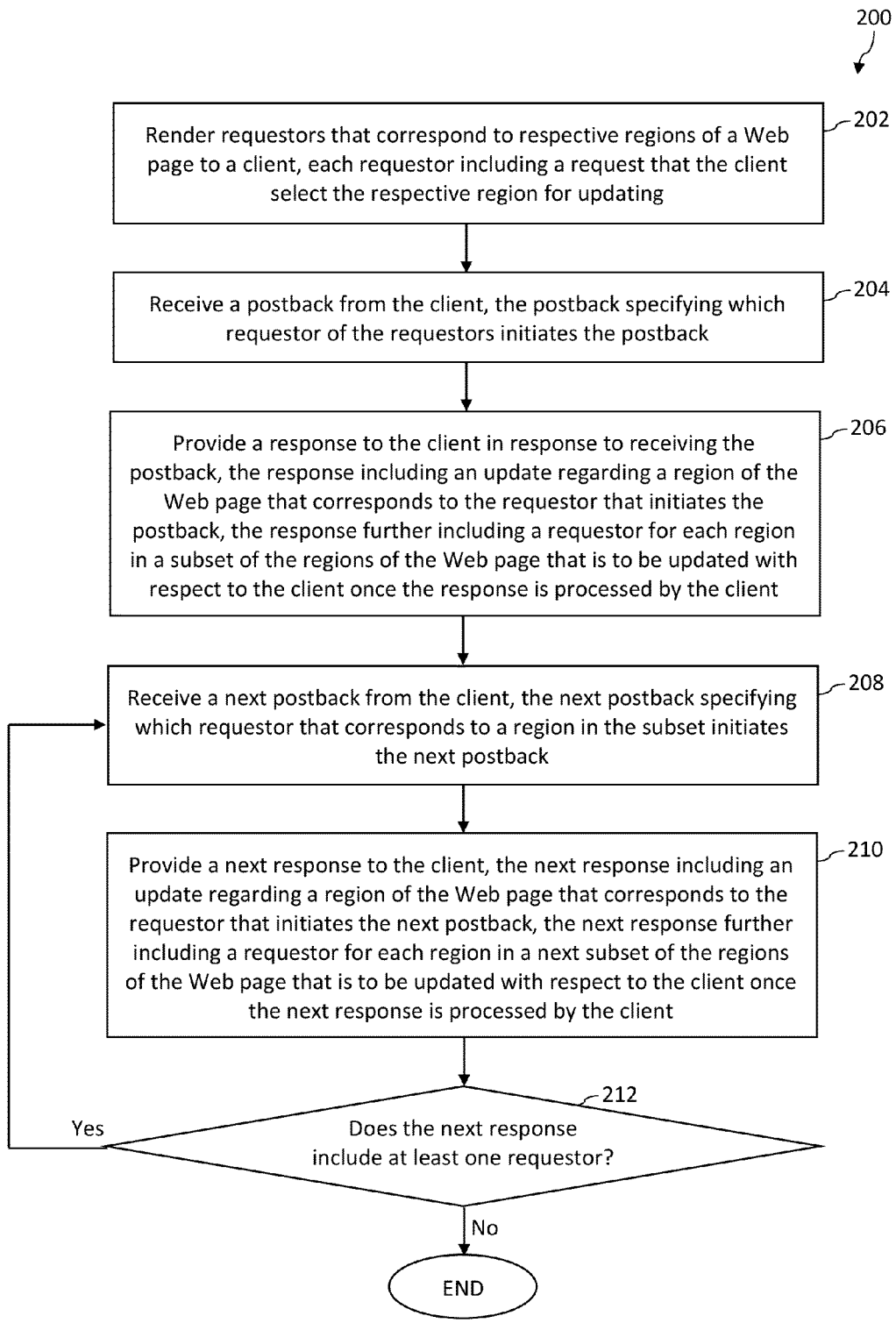
FIGS. 2 and 4 depict flowcharts of methods for coordinating multiple asynchronous postbacks in accordance with embodiments.
Figure 3:
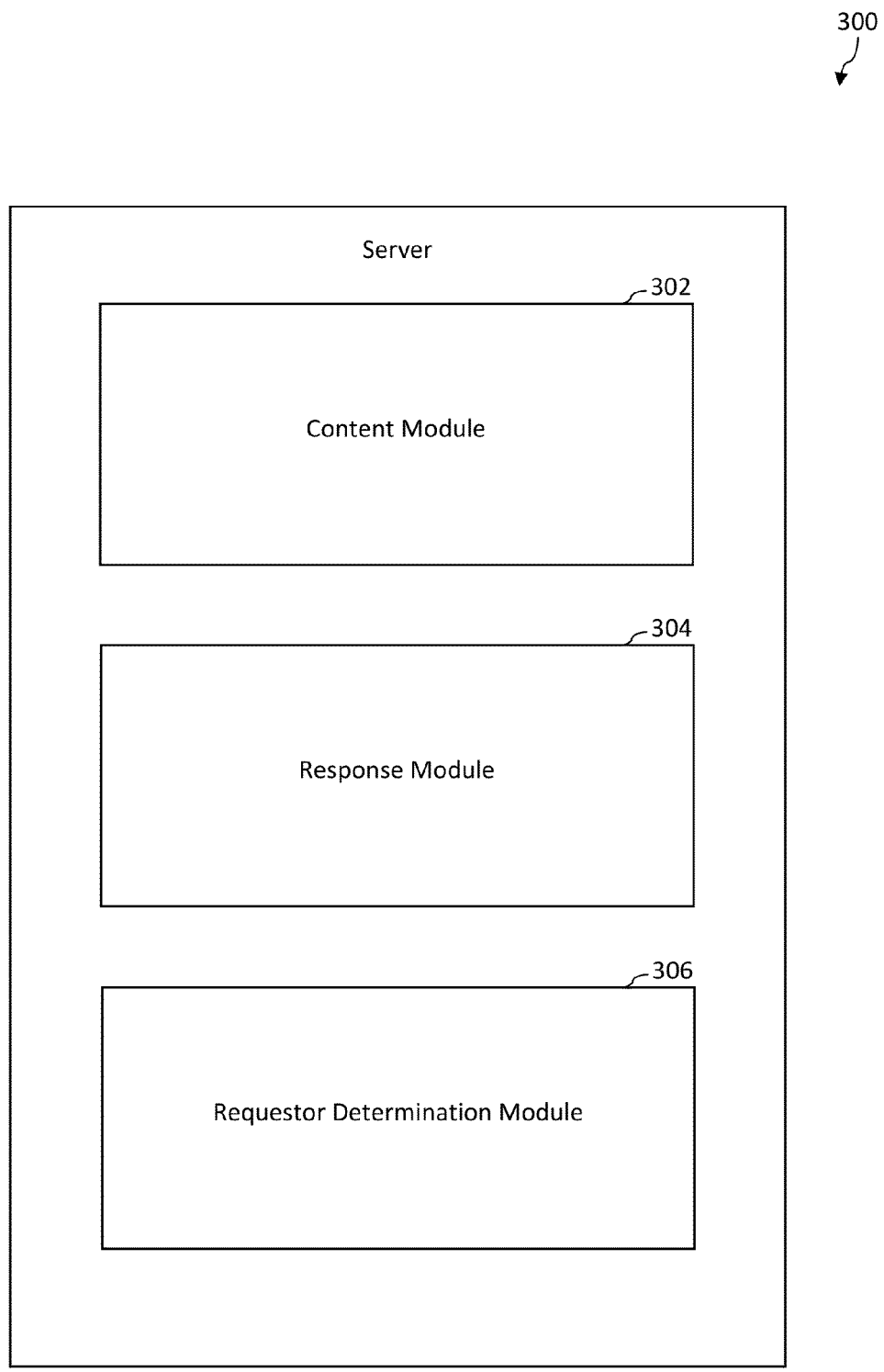
FIG. 3 is a block diagram of an example implementation of a server shown in FIG. 1 in accordance with an embodiment.

The server receives a postback from the client in response to rendering the requestors. Upon receiving the postback, the server provides a response to the client that includes an update regarding a region of the Web page that corresponds to a requestor that is specified by the postback. The response also includes requestors regarding the regions of the Web page that are to be updated once the response is processed by the client. The server may continue to communicate with the client in the manner described above until all regions of the Web page that are to be updated have been updated FIG. 2 depicts a flowchart 200 of a method for coordinating multiple asynchronous postbacks in accordance with an embodiment. Flowchart 200 is described from the perspective of a server. Flowchart 200 may be performed by any one or more of servers 106A-106M of computer system 100 shown in FIG. 1, for example. For illustrative purposes, flowchart 200 is described with respect to a server 300 shown in FIG. 3, which is an example of a server 106, according to an embodiment. As shown in FIG. 3, server 300 includes a content module 302, a response module 304, and a requestor determination module 306. Further structural and operational embodiments will be apparent to persons skilled in the relevant art(s) based on the discussion regarding flowchart 200.

As shown in FIG. 2, the method of flowchart 200 begins at step 202. In step 202, requestors are rendered to a client. The requestors correspond to respective regions of a Web page. For instance, each region of the Web page may correspond to a respective visual element (e.g., chart, table, image, video, etc.) of the Web page. Each requestor includes a request that the client select the respective region for updating. In an example implementation, content module 302 renders the requestors.

In a first example embodiment, content module 302 receives a get request for the Web page from the client. In accordance with this example embodiment, content module 302 is configured to provide a framework of the Web page to the client. For example, content module 302 may embed the requestors in the framework of the Web page. The content module 302 may be further configured to provide wait indicator(s) to the client. The wait indicator(s) specify that at least some of the regions of the Web page are to be updated with respect to the client. For example, a wait indicator may be provided for each region that is to be updated, thought the scope of the example embodiments is not limited in this respect.

In a second example embodiment, content module 302 executes instructions that enable each region of the Web page that requires a coordinated update to create an instance of a server control. A server control is an object that is configured to generate HTML and/or script (e.g., JavaScript®). A server control is a server-side equivalent of a requestor. A one-to-one mapping exists between the server controls and the requestors.

In accordance with the second example embodiment, content module 302 further executes instructions that enable each region to register an event handler on the server control to be notified when a postback for the respective region is happening. During the normal ASP.NET page execution, for example, content module 302 executes instructions that enable the instances of the server control that are created by regions that are to be updated to set their state to a "non-triggered" state. If the Web page has changed such that an update is no longer required for a region, the server control merely stays in the non-triggered state.

In further accordance with the second example embodiment, at render time, content module 302 executes instructions that enable each instance of the server control to render script, such as JavaScript®, to trigger a respective asynchronous postback. The script that is rendered by each server control is referred to as a requestor. If each server control renders script for identical client controls, the server controls may share information on the client, though the scope of the example embodiments is not limited in this respect.

In a third example embodiment, content module 302 configures the requestors to initiate postbacks in an order that corresponds to a reading order of the regions of the Web page that correspond to the respective requestors. For instance, the reading order may be defined from left to right and from top to bottom in the context of the Web page.

In a fourth example embodiment, content module 302 assigns priorities to the requestors. In accordance with the fourth example embodiment, the priorities correspond to an order with which the requestors are to initiate postbacks. For instance, requestors having relatively greater priorities may be configured to initiate postbacks before requestors having relatively lesser priorities.

At step 204, a postback is received from the client. The postback specifies which requestor of the requestors initiates the postback. In an example implementation, response module 304 receives the postback. For instance, content module 302 may be configured to interpret the postback to determine which requestor initiates the postback.

At step 206, a response is provided to the client in response to receiving the postback. The response includes an update regarding a region of the Web page that corresponds to the requestor that initiates the postback. The response further includes a requestor for each region in a subset of the regions of the Web page that is to be updated with respect to the client once the response is processed by the client. In an example implementation, response module 304 provides the response.

In accordance with the second example embodiment, content module 302 executes instructions that enable the instance of the server control that is created by the region that corresponds to the initiating requestor (i.e., the requestor that initiates the postback) to modify its state from a "non-triggered" state to a "triggered" state when the response is provided to the client. The triggered state indicates that the region that corresponds to the requestor that initiates the postback is being updated.

At step 208, a next postback is received from the client. The next postback specifies which requestor that corresponds to a region in the subset initiates the next postback. In an example implementation, content module 302 receives the next postback. For instance, content module 302 may be configured to interpret the next postback to determine which requestor that corresponds to a region in the subset initiates the next postback.

In accordance with the second example embodiment, instances of the server control other than the instance that is created by the region that corresponds to the initiating requestor (i.e., the requestor that initiates the next postback) effectively perform a "no operation" on the client in response to receiving the next postback from the client.

At step 210, a next response is provided to the client. The next response includes an update regarding a region of the Web page that corresponds to the requestor that initiates the next postback. The next response further includes a requestor for each region in a next subset of the regions of the Web page that is to be updated with respect to the client once the next response is processed by the client. In an example implementation, response module 304 provides the next response to the client.

Persons skilled in the relevant art(s) will recognize that the next subset may include any number of regions. The number of regions in the next subset may be fewer than, more than, or the same as the number of regions that are included in the subset that is described with respect to step 206. For example, the next subset may include at least one region that is not included in the subset that is described with respect to step 206. In another example, the subset that is described with respect to step 206 may include M regions, and the next subset may include N regions, such that N<M−1.

In accordance with the second example embodiment, content module 302 executes instructions that enable the instance of the server control that triggered the next postback to initiate its corresponding event in response to receiving the next postback from the client. Content module 302 further executes instructions that enable the region that corresponds to the requestor that initiates the next postback to perform its update. Accordingly, content module 302 may delete the instance of the server control that was created by the region that corresponds to the requestor that initiates the next postback, though the scope of the example embodiments is not limited in this respect. In an example implementation, other instances remain in the "non-triggered" state because their events were not initiated. In accordance with this example implementation, when the response is provided to the client, there may be one fewer instances competing to be the trigger for the next iteration. In other example implementations, however, including the update regarding the region that corresponds to the requestor that initiates the next postback in the next response may render one or more other instances unnecessary. Moreover, including the update regarding the region that corresponds to the requestor that initiates the next postback in the response may necessitate the creation of more instances of the server control.

At step 212, a determination is made whether the next response includes at least one requestor. In an example implementation, requestor determination module 306 determines whether the next response includes at least one requestor. If the next response includes at least one requestor, flow continues to step 208. Otherwise, flowchart 200 ends.

In accordance with the second example embodiment, if an error occurs with respect to retrieving an update regarding a region of the Web page, an efficiency of coordinating the multiple asynchronous postbacks may be improved if other updates that depend on that update are not retrieved. Response module 304 may be capable of handling an event that corresponds to a region that corresponds to a requestor that initiates a postback to determine whether an error has occurred with respect to updating that region. For instance, response module 304 may be configured to cancel updates that depend on a previous update when an error occurs with respect to updating a region to which the previous update pertains.

If an update regarding a designated region includes all of the information that is needed to update another region that has not yet been updated, the region that has not yet been updated may be updated merely based on the update regarding the designated region. For instance, the region that has not yet been updated may be updated without the need to provide a response to the client that includes an update regarding the region that has not yet been updated.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed.

It will be recognized that server 300 may not include one or more of content module 302, response module 304, and/or requestor determination module 306. Furthermore, server 300 may include modules in addition to or in lieu of content module 302, response module 304, and/or requestor determination module 306.

Figure 4:
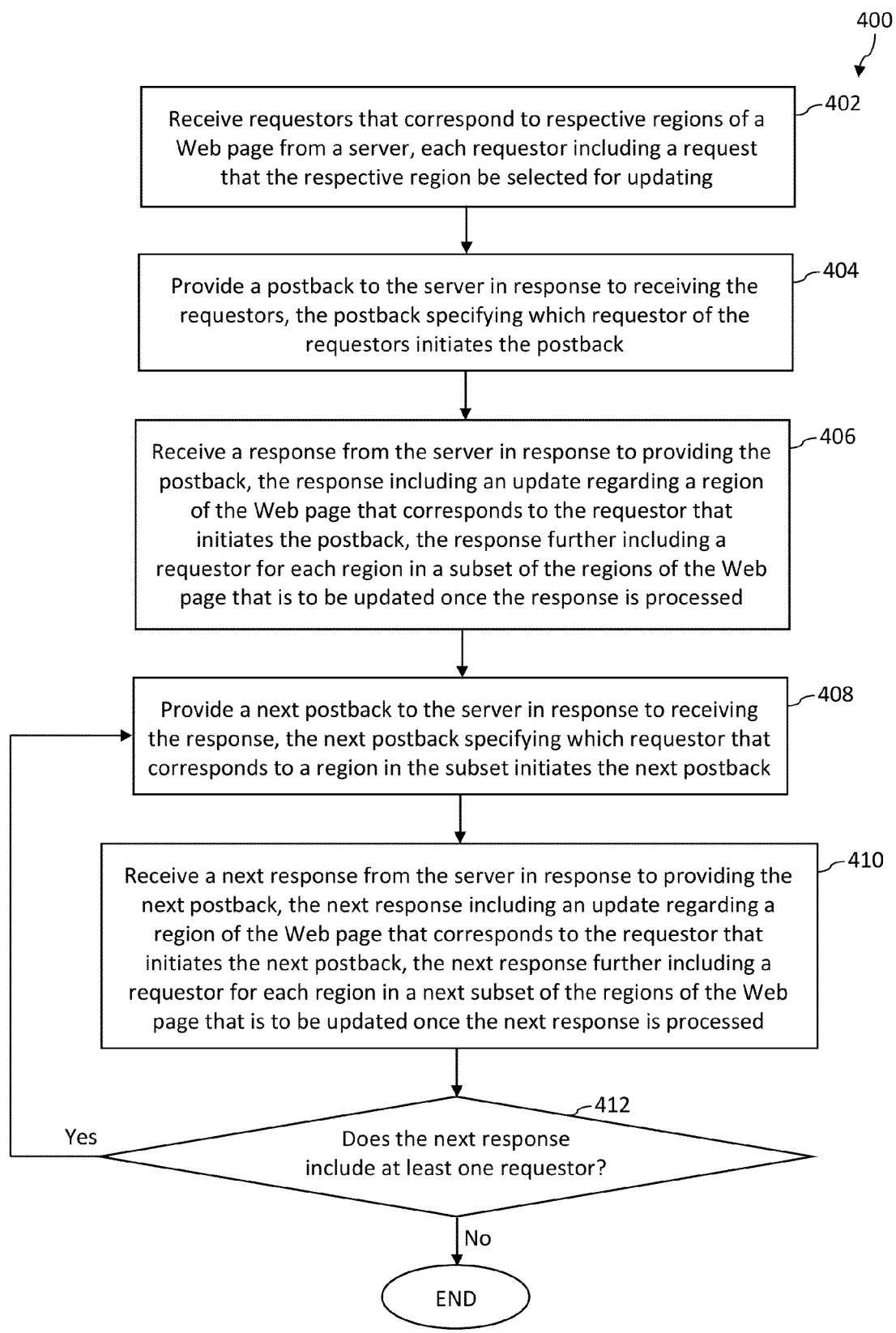
Figure 5:
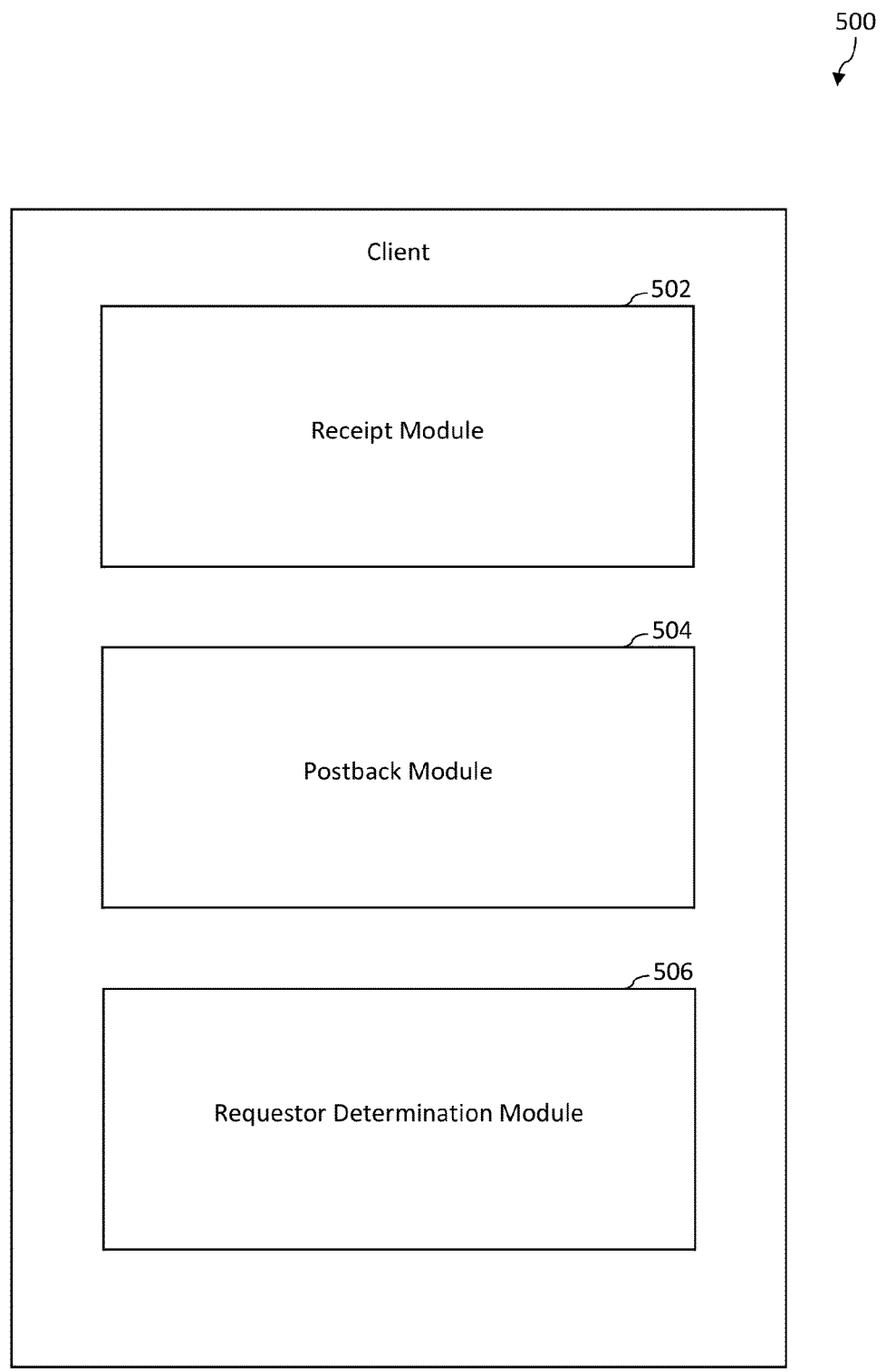
FIG. 5 is a block diagram of an example implementation of a client shown in FIG. 1 in accordance with an embodiment.

FIG. 4 depicts a flowchart 500 of another method for coordinating multiple asynchronous postbacks in accordance with an embodiment. Flowchart 400 is described from the perspective of a client. Flowchart 400 may be performed by any one or more of clients 108A-108N of computer system 100 shown in FIG. 1, for example. For illustrative purposes, flowchart 400 is described with respect to a client 500 shown in FIG. 5, which is an example of a client 108, according to an embodiment. As shown in FIG. 5, client 500 includes a receipt module 502, a postback module 504, and a requestor determination module 506. Further structural and operational embodiments will be apparent to persons skilled in the relevant art(s) based on the discussion regarding flowchart 400.

As shown in FIG. 4, the method of flowchart 400 begins at step 402. In step 402, requestors that correspond to respective regions of a Web page are received from a server. Each requestor includes a request that the respective region be selected for updating. In an example implementation, receipt module 502 receives the requestors. For instance, receipt module may interpret the requestors to determine the respective regions of the Web page to which the requestors correspond.

In a fifth example embodiment, receipt module 502 receives the requestors in response to postback module 504 providing a get request for the Web page to the client. Receipt module 502 may receive a framework of the Web page along with the requestors. For instance, the requestors may be embedded in the framework of the Web page that is received from the server. Receipt module 502 may receive wait indicator(s) from the server that specify that at least some of the regions of the Web page are to be updated. For example, a wait indicator may be received for each region that is to be updated, thought the scope of the example embodiments is not limited in this respect.

At step 404, a postback is provided to the server in response to receiving the requestors. The postback specifies which requestor of the requestors initiates the postback. In accordance with an example implementation, postback module 504 provides the postback to the server.

In a sixth example embodiment, the first requestor that is received at step 402 may initiate the postback that is provided to the server at step 404. In a seventh example embodiment, the requestors that are received at step 402 may have respective priorities. In accordance with the seventh example embodiment, the requestor that initiates the postback that is provided to the server at step 404 has a priority that is greater than priorities of the requestors other than the requestor that initiates the postback.

At step 406, a response is received from the server in response to providing the postback. The response includes an update regarding a region of the Web page that corresponds to the requestor that initiates the postback. The response further includes a requestor for each region in a subset of the regions of the Web page that is to be updated once the response is processed. In an example implementation, receipt module 502 receives the response. For instance, receipt module 502 may be configured to interpret the response to determine the update and/or to determine the requestors.

At step 408, a next postback is provided to the server in response to receiving the response. The next postback specifies which requestor that corresponds to a region in the subset initiates the next postback. In an example implementation, postback module 504 provides the next postback to the server.

At step 410, a next response is received from the server in response to providing the next postback. The next response includes an update regarding a region of the Web page that corresponds to the requestor that initiates the next postback. The next response further includes a requestor for each region in a next subset of the regions of the Web page that is to be updated once the next response is processed. In an example implementation, receipt module 502 receives the next response from the server. For instance, receipt module 502 may be configured to interpret the next response to determine the update and/or to determine the requestors.

At step 412, a determination is made whether the next response includes at least one requestor. In an example implementation, requestor determination module 506 determines whether the next response includes at least one requestor. If the next response includes at least one requestor, flow continues to step 408. Otherwise, flowchart 400 ends.

In some example embodiments, one or more steps 402, 404, 406, 408, 410, and/or 412 of flowchart 400 may not be performed. Moreover, steps in addition to or in lieu of steps 402, 404, 406, 408, 410, and/or 412 may be performed.

It will be recognized that client 500 may not include one or more of receipt module 502, postback module 504, and/or requestor determination module 506. Furthermore, client 500 may include modules in addition to or in lieu of receipt module 502, postback module 504, and/or requestor determination module 506.

Clients 108A-108N, content module 302, response module 304, requestor determination module 306, receipt module 502, postback module 504, and requestor determination module 506 may be implemented in hardware, software, firmware, or any combination thereof.

For example, any one or more of clients 108A-108N, content module 302, response module 304, requestor determination module 306, receipt module 502, postback module 504, and/or requestor determination module 506 may be implemented as computer program code configured to be executed in one or more processors.

In another example, any one or more of clients 108A-108N, content module 302, response module 304, requestor determination module 306, receipt module 502, postback module 504, and/or requestor determination module 506 may be implemented as hardware logic/electrical circuitry.

Figure 6:
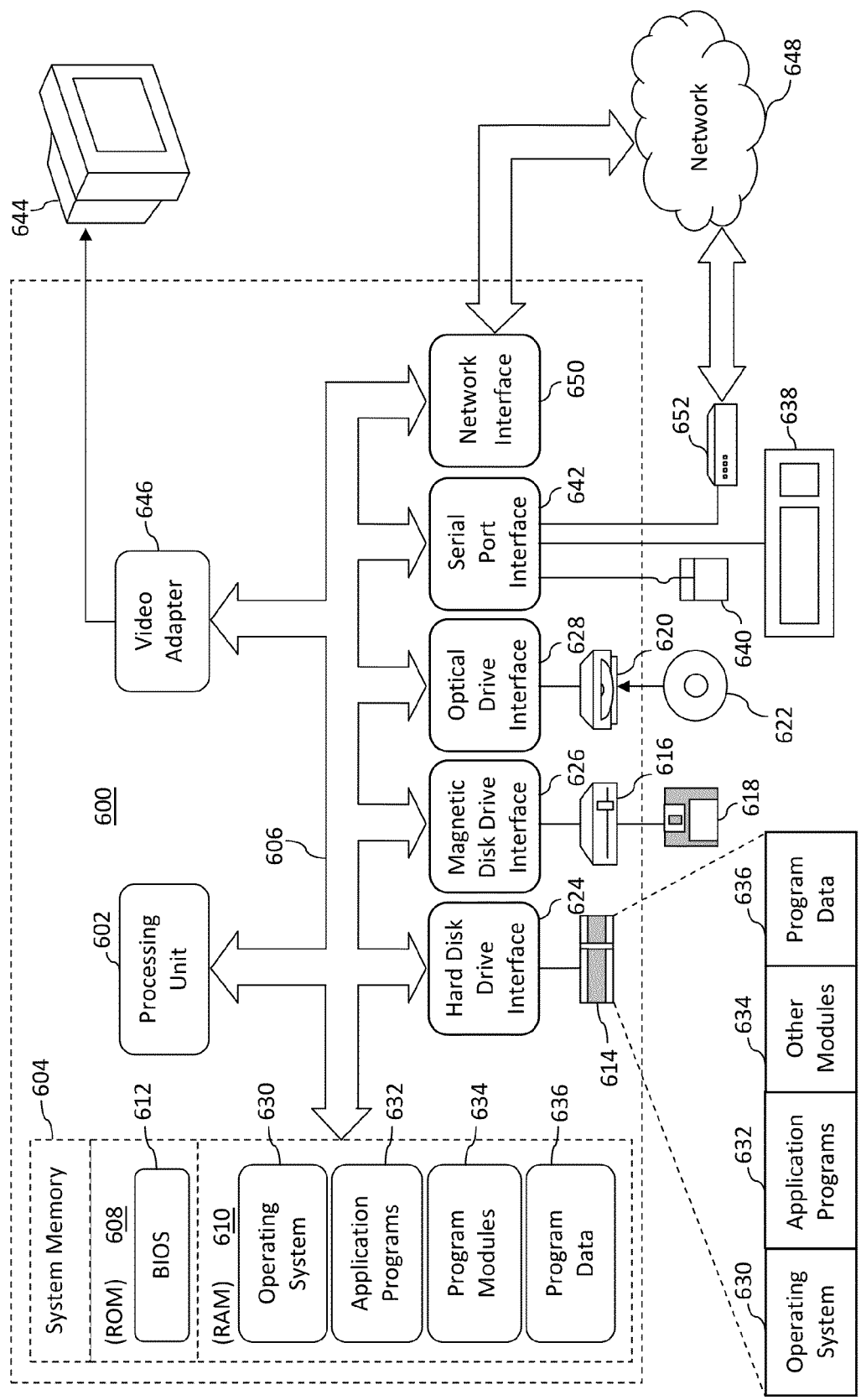
FIG. 6 depicts an example computer in which embodiments may be implemented.

FIG. 6 depicts an example computer 600 in which embodiments may be implemented. Any one or more of the user systems 102A-102N or the servers 106A-106M shown in FIG. 1 (or any one or more subcomponents thereof shown in FIGS. 3 and 5) may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of clients 108A-108N, content module 302, response module 304, requestor determination module 306, receipt module 502, postback module 504, requestor determination module 506, flowchart 200 (including any step of flowchart 200), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable medium" are used to generally refer to media such as the hard disk associated with hard disk drive 614, removable magnetic disk 618, removable optical disk 622, as well as other media such as flash memory cards, digital video disks, random access memories (RAMs), read only memories (ROM), and the like.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
rendering a plurality of requestors that corresponds to a plurality of respective regions of a Web page to a client, each requestor including a request that the client select the respective region for updating;
receiving a postback from the client, the postback specifying a requestor of the plurality of requestors that initiates the postback; and
providing a response to the client in response to receiving the postback, the response including an update regarding a region of the plurality of regions that corresponds to the requestor that initiates the postback, the response further including a requestor for each region in a subset of the plurality of regions that is to be updated with respect to the client once the response is processed by the client, the requestor for each region configured to initiate a postback for the respective region.

2. The method of claim 1, further comprising:
receiving a second postback from the client in response to providing the response to the client, the second postback specifying a requestor that initiates the second postback; and
providing a second response to the client in response to receiving the second postback, the second response including an update regarding a region of the plurality of regions that corresponds to the requestor that initiates the second postback, the second response further including a requestor for each region in a second subset of the plurality of regions that is to be updated with respect to the client once the second response is processed by the client.

3. The method of claim 2, wherein the second subset includes at least one region that is not included in the first subset.

4. The method of claim 2, wherein the first subset includes M regions;
wherein the second subset includes N regions; and
wherein N<M−1.

5. The method of claim 1, further comprising:
creating an object for each region in the subset in response to receiving the postback, each object having a non-triggered state that indicates that each region in the subset is to be updated once the response is processed by the client;
wherein providing the response to the client comprises:
providing a response to the client that includes a requestor for each region in the subset based on the object for each region having the non-triggered state.

6. The method of claim 1, wherein rendering the plurality of requestors comprises:
rendering script that includes the plurality of requestors to the client.

7. The method of claim 1, further comprising:
configuring the requestors for the regions in the subset to initiate postbacks in an order that corresponds to a reading order of the regions in the subset in the context of the Web page.

8. The method of claim 1, further comprising:
assigning priorities to the requestors for the regions in the subset, the priorities corresponding to an order with which the requestors are to initiate postbacks.

9. A system comprising:
a content module that includes electrical circuitry and is configured to render a plurality of requestors that corresponds to a plurality of respective regions of a Web page to a client, each requestor including a request that the client select the respective region for updating,
the content module further configured to interpret a postback from the client, the postback specifying a requestor of the plurality of requestors that initiates the postback;
an object module configured to create an object for each region in a subset of the plurality of regions that is to be updated with respect to the client once a response is processed by the client, each object having a non-triggered state that indicates that each region in the subset is to be updated once the response is processed by the client; and
a response module configured to provide the response to the client in response to the postback, the response including an update regarding a region of the plurality of regions that corresponds to the requestor that initiates the postback, the response further including a requestor for each region in the subset, the requestor for each region configured to initiate a postback for the respective region.

10. The system of claim 9, wherein the content module is further configured to interpret a second postback from the client, the second postback specifying a requestor that initiates the second postback;
wherein the object module is further configured to create an object for each region in a second subset of the plurality of regions that is to be updated with respect to the client once a second response is processed by the client, the objects for the regions in the second subset having a non-triggered state that indicates that the regions in the second subset are to be updated once the second response is processed by the client; and wherein the response module is further configured to provide the second response to the client in response to the second postback, the second response including an update regarding a region of the plurality of regions that corresponds to the requestor that initiates the second postback, the second response further including a requestor for each region in the second subset.

11. The system of claim 10, wherein the second subset includes at least one region that is not included in the first subset.

12. The system of claim 10, wherein the first subset includes M regions;
wherein the second subset includes N regions; and
wherein N<M−1.

13. The system of claim 9, wherein the content module is configured to render script that includes the plurality of requestors to the client.

14. A method comprising:
receiving a plurality of requestors that corresponds to a plurality of respective regions of a Web page from a server, each requestor including a request that the respective region be selected for updating;
providing a postback to the server in response to receiving the plurality of requestors, the postback specifying a requestor of the plurality of requestors that initiates the postback; and
receiving a response from the server in response to providing the postback, the response including an update regarding a region of the plurality of regions that corresponds to the requestor that initiates the postback, the response further including a requestor for each region in a subset of the plurality of regions that is to be updated once the response is processed, the requestor for each region configured to initiate a postback for the respective region.

15. The method of claim 14, further comprising:
providing a second postback to the server in response to receiving the response, the second postback specifying a requestor that initiates the second postback; and
receiving a second response from the server in response to providing the second postback, the second response including an update regarding a region of the plurality of regions that corresponds to the requestor that initiates the second postback, the second response further including a requestor for each region in a second subset of the plurality of regions that is to be updated once the second response is processed.

16. The method of claim 15, wherein the second subset includes at least one region that is not included in the first subset.

17. The method of claim 15, wherein the first subset includes M regions;
wherein the second subset includes N regions; and
wherein N<M−1.

18. The method of claim 14, wherein receiving the plurality of requestors comprises:
receiving script that includes the plurality of requestors from the server.

19. The method of claim 14, wherein receiving the plurality of requestors comprises:
receiving the requestor that initiates the postback before receiving other requestors of the plurality of requestors.

20. The method of claim 14, wherein receiving the plurality of requestors comprises:
receiving the plurality of requestors having a plurality of respective priorities; and
wherein the requestor that initiates the postback has a priority that is greater than priorities of the requestors other than the requestor that initiates the postback.

* * * * *